US008339651B2

(12) United States Patent
Tanjima et al.

(10) Patent No.: US 8,339,651 B2
(45) Date of Patent: Dec. 25, 2012

(54) PRINTER AND COMPUTER-READABLE RECORDING MEDIUM STORING PRINTING PROGRAM

(75) Inventors: Naoki Tanjima, Nissin (JP); Yoshihiko Sugimura, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 1158 days.

(21) Appl. No.: 12/152,900

(22) Filed: May 16, 2008

(65) Prior Publication Data

US 2008/0292381 A1 Nov. 27, 2008

(30) Foreign Application Priority Data

May 24, 2007 (JP) ................................ 2007-137341

(51) Int. Cl.

| | |
|---|---|
| ***G06K 15/00*** | (2006.01) |
| ***H04N 1/00*** | (2006.01) |
| ***G03G 15/00*** | (2006.01) |
| ***B41J 5/30*** | (2006.01) |
| ***B41J 3/46*** | (2006.01) |

(52) U.S. Cl. ....... 358/1.18; 358/1.6; 358/403; 358/1.15; 399/81; 400/61; 400/83

(58) Field of Classification Search ........................ None
See application file for complete search history.

(56) References Cited

U.S. PATENT DOCUMENTS

| | | | |
|---|---|---|---|
| 5,253,334 A | 10/1993 | Kimura et al. | |
| 5,538,352 A * | 7/1996 | Sugiura ...................... | 400/615.2 |
| 6,491,454 B1 * | 12/2002 | Toyosawa et al. .............. | 400/83 |
| 7,532,351 B2 | 5/2009 | Horii et al. | |
| 2003/0093757 A1 | 5/2003 | Silverbrook et al. | |
| 2004/0036915 A1 * | 2/2004 | Vleurinck et al. ........... | 358/1.18 |
| 2004/0190048 A1 | 9/2004 | Egawa et al. | |
| 2005/0063001 A1 | 3/2005 | Tanimoto | |
| 2005/0278190 A1 | 12/2005 | Nakai et al. | |
| 2007/0103506 A1 | 5/2007 | Morikawa | |

FOREIGN PATENT DOCUMENTS

| | | |
|---|---|---|
| EP | 0934828 A2 | 8/1999 |
| EP | 1070588 A1 | 1/2001 |
| EP | 1186429 A2 | 3/2002 |
| EP | 1788476 A1 | 5/2007 |
| JP | 5018853 | 3/1993 |
| JP | 6024084 | 2/1994 |
| JP | 11175290 | 7/1999 |
| JP | H11-175280 | 7/1999 |
| JP | 2000194518 | 7/2000 |
| JP | 2003-330638 | 11/2003 |

(Continued)

*Primary Examiner* — King Poon
*Assistant Examiner* — Vincent Peren
(74) *Attorney, Agent, or Firm* — McCarter & English, LLP

(57) ABSTRACT

A printer includes a connection device that connects to an external device, a printing device that prints a character on a print medium, an input device that inputs the character and an instruction, and a first data acquisition device that acquires first data created in the external device via the connection device. The printer further includes a print history storage device that stores print history information of the first data and a second data used for printing by the printing device among the first data acquired by the first data acquisition device and the second data created based on the character and the instruction inputted by the input device. The printer also includes a print control device that causes the printing device to perform printing based on the print history information stored in the print history storage device.

12 Claims, 11 Drawing Sheets

FOREIGN PATENT DOCUMENTS

| | | | |
|---|---|---|---|
| JP | 2004-188943 | | 7/2004 |
| JP | 2004284259 | | 10/2004 |
| JP | 2005-053183 | | 3/2005 |
| JP | 2005-138443 | | 6/2005 |
| JP | 2005-173725 | | 6/2005 |
| JP | 2005-349641 | | 12/2005 |
| WO | 2005/095111 | A2 | 10/2005 |
| WO | 2006/099625 | A2 | 9/2006 |

* cited by examiner

FIG. 10

<Print History>
2 (PC ) 123456789

FIG. 11

<Print History>
1 (PC ) 123456789

PRINTER AND COMPUTER-READABLE RECORDING MEDIUM STORING PRINTING PROGRAM

CROSS-REFERENCE TO RELATED APPLICATION

This application claims priority to JP2007-137341, filed May 24, 2007, the content of which is hereby incorporated by reference in its entirety.

BACKGROUND

The present disclosure relates to a printer and a computer-readable recording medium storing a printing program. More specifically, the present disclosure relates to a printer and a computer-readable recording medium storing a printing program that can reprint a document that has been created in the printer or in an external device and has been printed in the printer.

Conventionally, there has been known such a tape printer as to be able to create data of a document to be printed on a tape-like print medium in the tape printer. This type of a tape printer can store data of a document that has been created in the tape printer in memory so that the document can be printed again later (e.g. Japanese Laid-Open Patent Publication No. Hei 6-24084). Printing can also be performed by connecting a tape printer to an external device such as a personal computer (PC) so that the tape printer may receive data of a document created in the external device and print the document.

Conventionally, there has been such a printer that automatically saves data of a document that has been created in the printer in the printer's memory when the document is printed. However, there has been no such printer that automatically saves data of a document that has been created in an external device such as a PC in the printer's memory in the same way. That is, as long as the printer is connected to the external device, the document that has been created in the external device can be printed repeatedly. However, if a user disconnects the printer from the external device, carries the printer to a place away from the external device and uses the printer in the place, the document that has been created in the external device cannot be printed again. In particular, the conventional printer cannot have met users' needs to reprint a document soon after printing the document.

SUMMARY

Various exemplary embodiments of the broad principles derived herein provide a printer and a computer-readable recording medium storing a printing program that can easily reprint a document that has been created in an external device as well as a document that has been created in the printer even in the case where the printer is not connected to the external device.

Exemplary examples provide a printer that includes a connection device that connects to an external device, a printing device that prints a character on a print medium, an input device that inputs the character and an instruction, a first data acquisition device that acquires first data created in the external device via the connection device, a print history storage device that stores print history information of the first data and a second data used for printing by the printing device among the first data acquired by the first data acquisition device and the second data created based on the character and the instruction inputted by the input device, and a print control device that causes the printing device to perform printing based on the print history information stored in the print history storage device.

Exemplary examples provide a computer-readable recording medium storing a printing program, the program causes a controller to perform a first data acquisition step of acquiring first data created in an external device connected to a printer, a print history storage step of storing print history information of the first data and a second data used for printing among the first data acquired in the first data acquisition step and the second data created based on a character and an instruction inputted in the printer, and a print control step of performing printing the character on a print medium based on the print history information stored in the print history storage step.

BRIEF DESCRIPTION OF THE DRAWINGS

Exemplary embodiments will be described below in detail with reference to the accompanying drawings in which:

FIG. 10 is an explanatory illustration of another print history that is displayed on the LCD; and FIG. 11 is an explanatory illustration of a further print history that is displayed on the LCD.

DETAILED DESCRIPTION OF THE EXEMPLARY EMBODIMENTS

Figure 1:
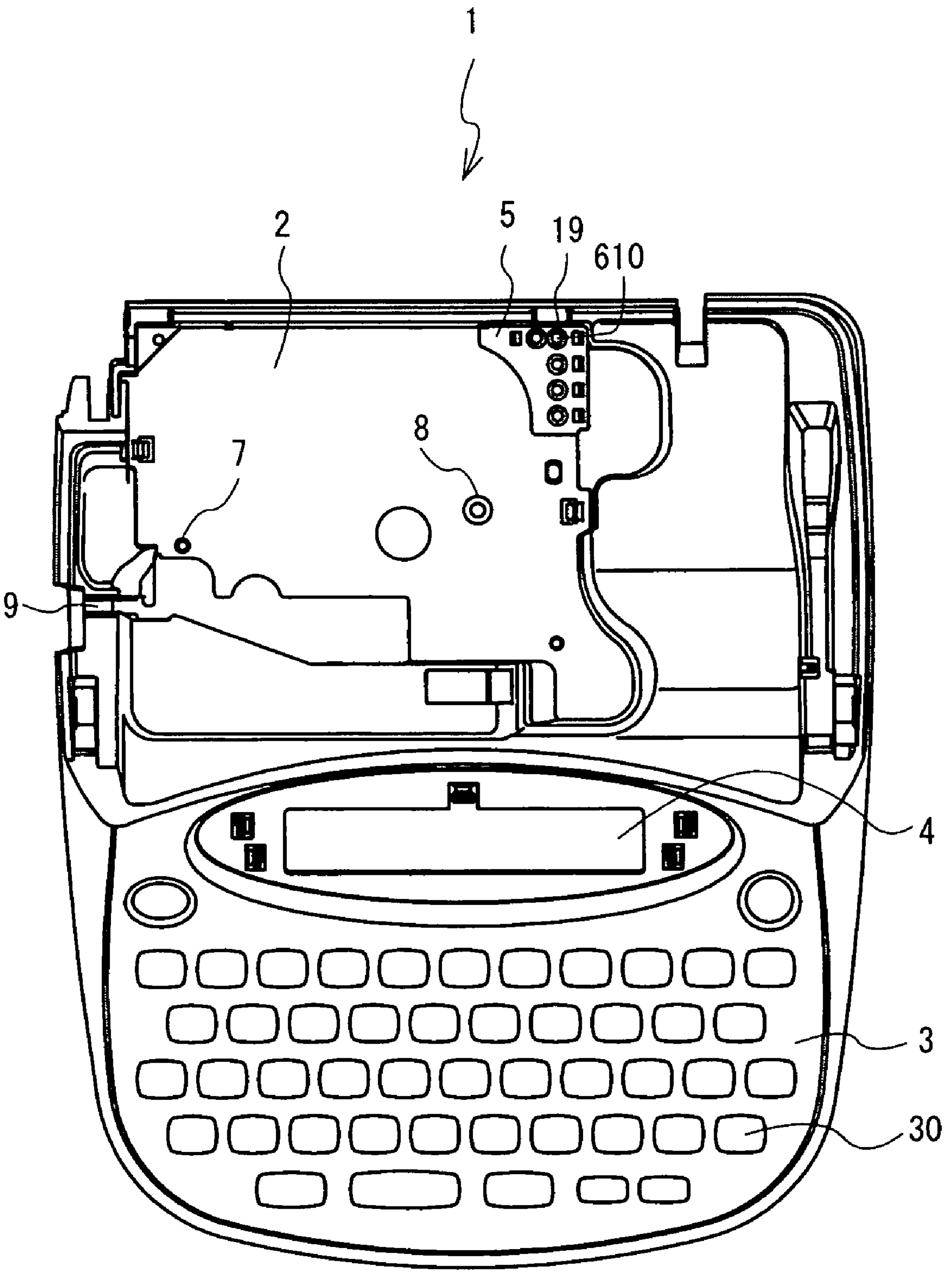
FIG. 1 is a plan view of a tape printer showing a state where a lid of a cassette storage portion is removed.

The following will describe a tape printer 1 according to an embodiment of the present disclosure with reference to the drawings. The drawings will be used for describing technical features that can be adopted. The configurations of the apparatus and the flowcharts of various processing that are illustrated in the drawings are not intended to limit the scope of the invention to the particular configurations or processing but are merely examples for description.

The physical configuration of the tape printer 1 will be described with reference to FIG. 1. In the following description, the lower and upper directions of the page of FIG. 1 are referred to as the front and rear directions of the tape printer 1, respectively, and the right and left directions of the page are referred to as the right and left directions of the tape printer 1, respectively.

As shown in FIG. 1, the tape printer 1 has a cassette storage portion 2, which is a recess, at the rear portion of the tape printer 1 and a keyboard 3 at the front portion. The cassette storage portion 2 is configured to store a tape cassette 51 (see FIGS. 2 and 3). A plurality of keys 30 are arranged on the keyboard 3. Although not shown in FIG. 1, an adapter slot and a connector are provided on the right side of the tape printer 1. A power supply adapter is attached to the adapter slot.

Figure 4:
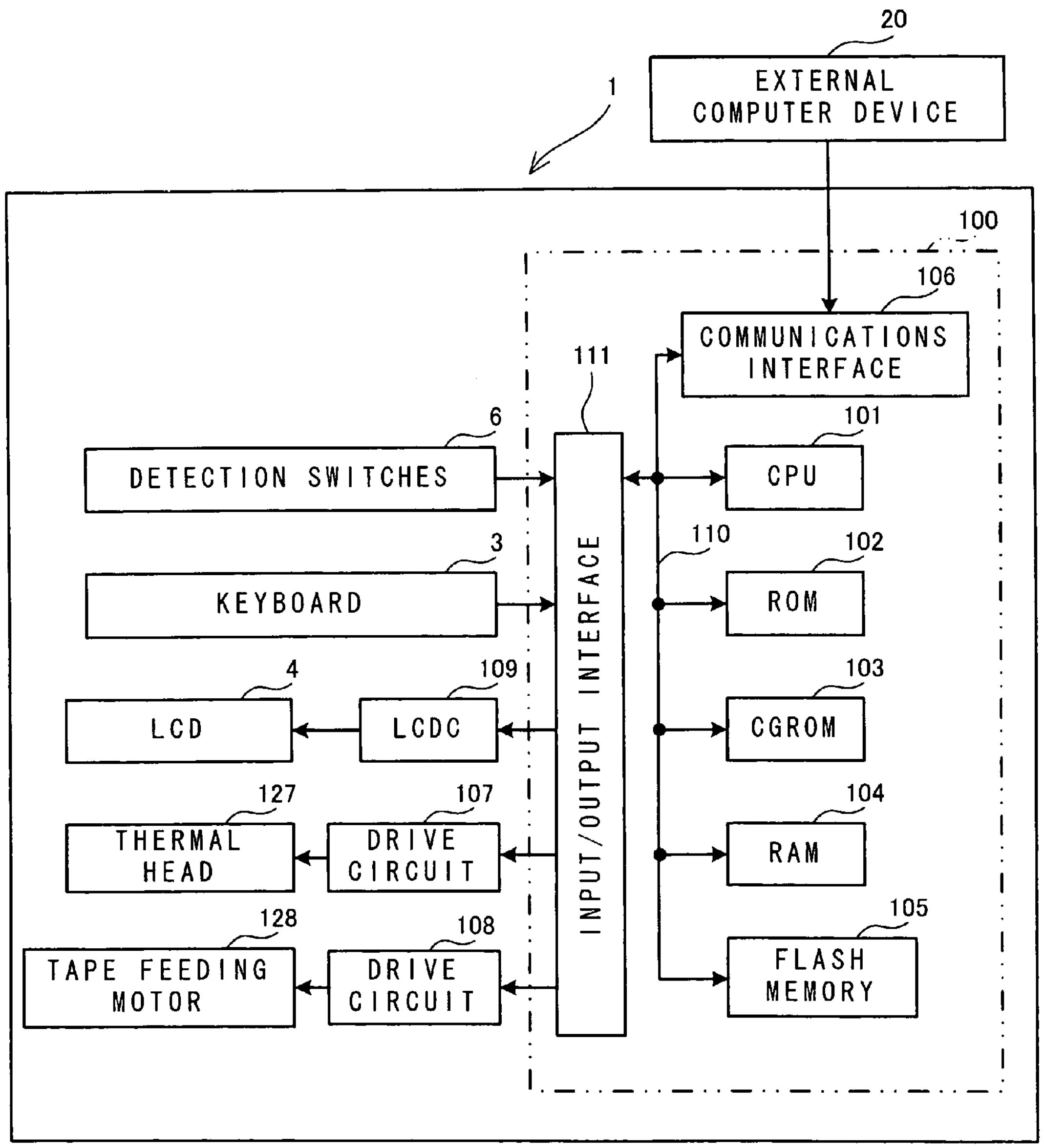
FIG. 4 is a block diagram showing an electrical configuration of the tape printer.

Connected to the connector is a cable (e.g. a USB cable) that is used to connect the printer to an external computer device 20 (see FIG. 4).

A ribbon take-up shaft 8 is erected in a direction perpendicular to the bottom of the cassette storage portion 2 at the right side of center portion of the cassette storage portion 2. The ribbon take-up shaft 8 is rotatably driven by a tape feeding motor 128 (see FIG. 4) to rotate a ribbon take-up spool 71 (see FIG. 3) of the tape cassette 51, thereby taking up an ink ribbon 69. A tape feeding roller shaft 7 is erected in a direction perpendicular to the bottom of the cassette storage portion 2 in the left front portion of the cassette storage portion 2 (near the keyboard 3). The tape feeding roller shaft 7 is rotatably driven by the tape feeding motor 128 via an appropriate transmission mechanism, thereby rotating a tape feeding roller 62 (see FIG. 3). A tape exit slot 9 is provided on the left side of the cassette storage portion 2. A print tape 67 on which a character has been printed is discharged out of the tape cassette 51, and then is discharged out of the tape printer 1 through the tape exit slot 9.

A cassette detection portion 5 is provided in a corner (in a right top corner in FIG. 1) in the cassette storage portion 2. The cassette detection portion 5 is provided with a plurality of (five in the exemplary embodiment) holes 19. Plungers 610 of respective detection switches 6 (see FIG. 4) provided on a detection sensor substrate protrude from the holes 19. The detection switches 6 can detect a type of a tape cassette 51 (hereinafter "type of a tape cassette 51" is referred to as "tape type") stored in the cassette storage portion 2 in combination with identification holes 661 (see FIG. 3) of the tape cassette 51.

The keys 30 on the keyboard 3 include character keys and functions keys used for inputting various function commands. The character keys are used to input alphabets, Japanese HIRAGANA letters, Japanese KATAKANA letters, numerals, symbols, etc. The function keys include, for example, a print key, a history print key, a cancel key, and a determination key. The print key is used to instruct the tape printer 1 to print a document inputted via the character keys. The history print key is used to instruct the tape printer 1 to reprint a document that has been printed. The cancel key is used to cancel instructions. The determination key is used to determine the instructions. Thus, the tape printer 1 according to the exemplary embodiment has not only a print function but also a function to create a document to be printed in the tape printer 1. Further, the tape printer 1 has a liquid crystal display (LCD) 4 between the cassette storage portion 2 and the keyboard 3. A document that has been inputted via the keyboard 3 and a document that has been received from the external computer device 20 are displayed on the LCD 4.

The physical configuration of the tape cassette 51 to be stored in the cassette storage portion 2 of the tape printer 1 will be described with reference to FIGS. 2 and 3.

Figure 2:
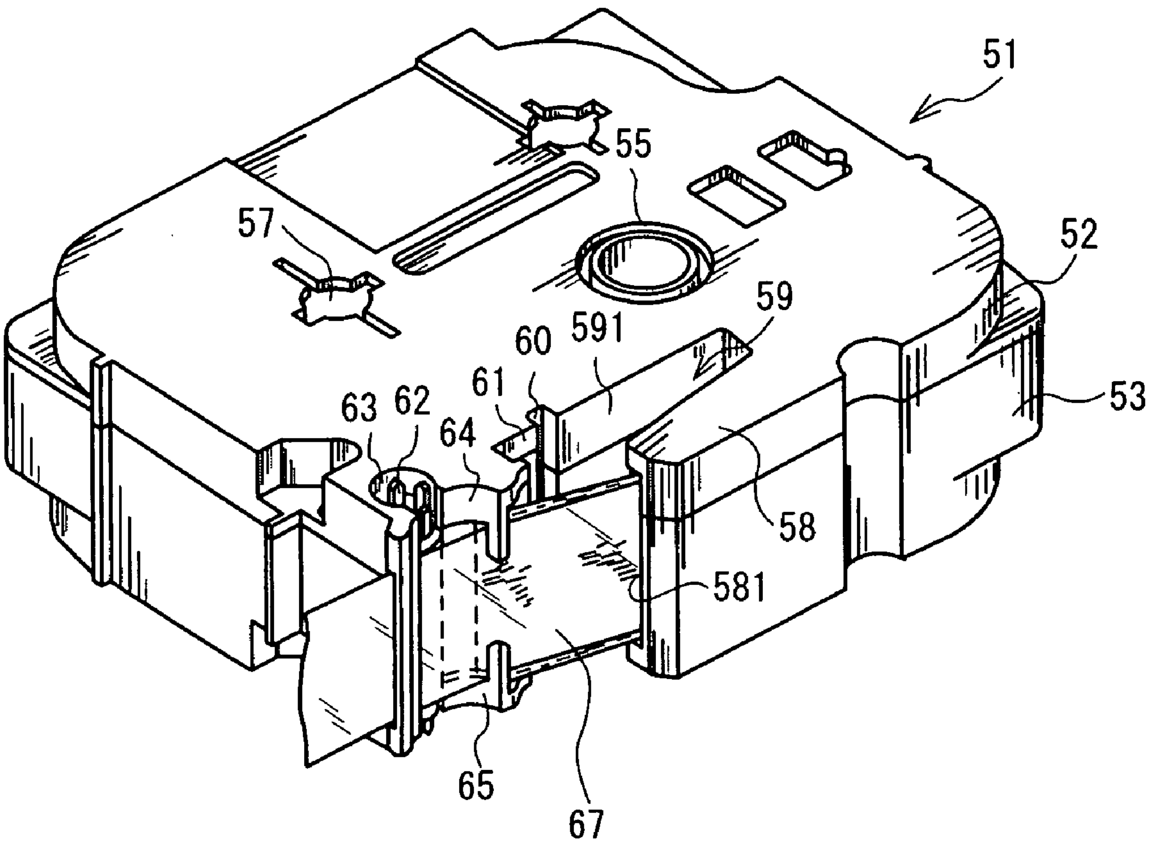
FIG. 2 is a perspective view of a tape cassette.

As shown in FIG. 2, the tape cassette 51 includes an upper case 52 and a lower case 53. The tape cassette 51 has supporting holes 57 and 55. The supporting holes 57 and 55 rotatably support a tape spool 68 and the ribbon take-up spool 71, respectively. Although FIG. 2 represents only the supporting holes 55 and 57 formed in the upper case 52, the lower case 53 also has supporting holes 55 and 57 facing the respective supporting holes 55 and 57 formed in the upper case 52. An arm portion 58 is provided at the front side (at the right bottom side in FIG. 2) of the tape cassette 51. The arm portion 58 guides the print tape 67 pulled out from the tape spool 68 and the ink ribbon 69 pulled out from a ribbon spool 70 so that the print tape 67 and the ink ribbon 69 may be sent out from an opening portion 581. The print tape 67, the tape spool 68, the ink ribbon 69, the ribbon spool 70, and the ribbon take-up spool 71 will be described later with reference to FIG. 3.

A head mounting portion 59 is provided in the rear of the arm portion 58. When the tape cassette 51 is mounted in the tape printer 1, a thermal head 127 (see FIG. 4) of the tape printer 1 is placed in the head mounting portion 59. In the head mounting portion 59, a first fitting portion 60 is formed in a wall portion 591 facing the arm portion 58. The first fitting portion 60 is dented rearward of the tape cassette 51 (upward on the left side in FIG. 2). A second fitting portion 61 is formed in the left side wall of the head mounting portion 59. The second fitting portion 61 is dented in a direction perpendicular to the first fitting portion 60 (in the direction along the wall portion 591). Two projections formed on a head holder (not shown) for supporting the thermal head 127 are fitted into the first fitting portion 60 and the second fitting portion 61. Accordingly, the thermal head 127 can be securely placed in the head mounting portion 59 without interference with the print tape 67 and the ink ribbon 69.

A supporting hole 63 is provided downstream of the head mounting portion 59 with respect to a feeding direction of the print tape 67 and the ink ribbon 69. The supporting hole 63 rotatably supports the tape feeding roller 62 (see FIG. 3). A pair of restriction members 64 and 65 (an upper member 64 and a lower member 65) is provided in the vicinity of the supporting hole 63. The restriction members 64 and 65 restrict the print tape 67 in the tape width direction when the print tape 67, on which characters are printed, is fed downstream of the thermal head 127.

The internal configuration of the tape cassette 51 will be described with reference to FIG. 3. As shown in FIG. 3, at the rear portion of the lower case 53 (at the upper portion in FIG. 3), the tape spool 68 is disposed so that the tape spool 68 may rotate around the supporting hole 57. The print tape 67 is wound on the tape spool 68 with a separation sheet of the print tape 67 facing outward. The ribbon spool 70 is rotatably disposed at the front portion of the lower case 53 (at the lower portion in FIG. 3). The ink ribbon 69 is wound on the ribbon spool 70. The ribbon take-up spool 71 is disposed between the tape spool 68 and the ribbon spool 70 so that the ribbon take-up spool 71 may rotate around the supporting hole 55 described above. When the tape cassette 51 is stored in the cassette storage portion 2, the ribbon take-up shaft 8 (see FIG. 1) meshes with the ribbon take-up spool 71. The ribbon take-up shaft 8 rotatably drives the ribbon take-up spool 71 so that the ribbon take-up spool 71 may pull out the ink ribbon 69 from the ribbon spool 70 and take up the ink ribbon 69 that has been used for printing characters.

Figure 3:
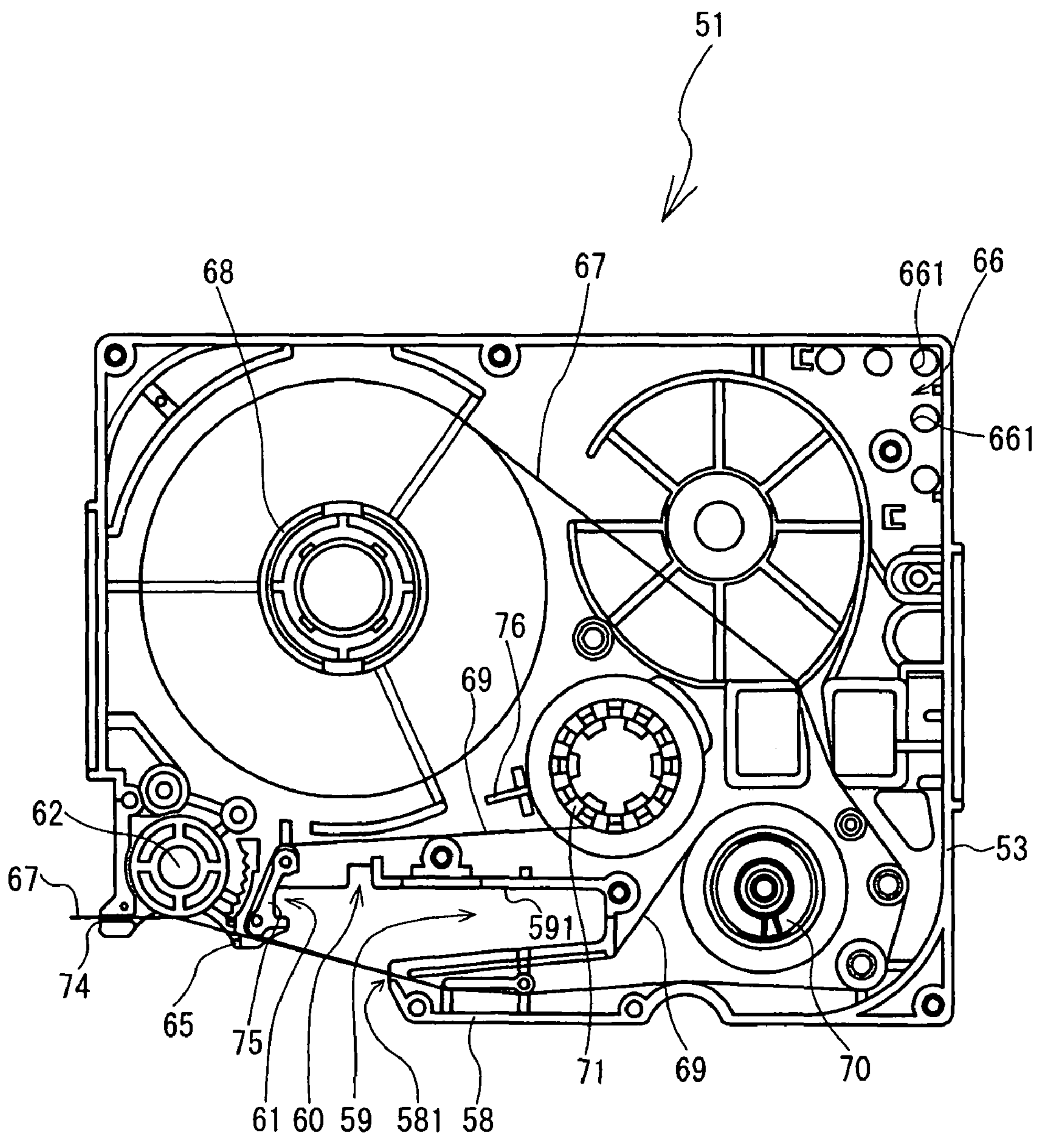
FIG. 3 is a plan view of a lower case in a state where an upper case is removed.

The tape feeding roller 62, which feeds the print tape 67, is provided in the downstream side of the head mounting portion 59 of the lower case 53 (in the lower left corner in FIG. 3). When the tape cassette 51 is stored in the cassette storage portion 2, the tape feeding roller shaft 7 (see FIG. 1) meshes with the tape feeding roller 62. The tape feeding roller shaft 7 rotatably drives the tape feeding roller 62 so that the print tape 67 may be pulled out from the tape spool 68 by cooperation of the tape feeding roller 62 and a pressure roller (not shown). The pressure roller is provided in the tape printer 1, facing the tape feeding roller 62. The pulled out print tape 67 comes out of the opening portion 581 in the arm portion 58, passes the front side (the lower side in FIG. 3) of the head mounting portion 59, and then is discharged out of the tape cassette 51 through a tape discharge portion 74. Finally, the print tape 67 is discharged out of the tape printer 1 through the tape exit slot 9 (see FIG. 1). The ink ribbon 69 is pulled out from the ribbon spool 70 by the ribbon take-up spool 71. The pulled out ink ribbon 69 comes out of the opening portion 581 in the arm portion 58, passes the front side of the head mounting portion 59, and then is guided by a guide portion 75 to be taken up around the ribbon take-up spool 71. The guide portion 75 is formed inside the restriction members 64 and 65 (see FIG. 2). A clutch spring 76 is provided at the bottom of the ribbon take-up spool 71. The clutch spring 76 prevents the ribbon take-up spool 71 from being reversely rotated to loosen the taken up ink ribbon 69.

An identification portion 66 is formed at the right rear corner portion of the lower case 53, which makes contact with the cassette detection portion 5 when the tape cassette 51 is stored in the cassette storage portion 2 of the tape printer 1. The plurality of identification holes 661 for detecting a tape type are provided in the identification portion 66. The tape type includes a width and a material of the print tape 67 accommodated in the tape cassette 51, and information on whether the print tape 67 can be recycled. The formation pattern of the identification holes 661 differs depending on the tape type. The plungers 610 (see FIG. 1) of plural (five in the exemplary embodiment) detection switches 6 can be inserted into the respective identification holes 661. The detection switches 6 are disposed in the cassette detection portion 5 of the tape printer 1. For example, when a detection switch 6 faces the corresponding identification hole 661, a plunger 610 of the detection switch 6 is inserted into the identification hole 661, so that the detection switch 6 remains off. On the other hand, when a detection switch 6 faces a portion where no identification hole 661 is formed, a plunger 610 of the detection switch 6 is pressed by a substrate of the identification portion 66, so that the detection switch is turned on. The tape type can be detected based on a combination of ON/OFF signals from the detection switches 6. In the exemplary embodiment, five detection switches 6 are provided. Two out of the five detection switches 6 are used for detection of a tape width. Four types of tape widths of 12 mm, 18 mm, 24 mm, and 36 mm can be detected corresponding to the combinations of signals from the two detection switches 6 of OFF and OFF, OFF and ON, ON and OFF, and ON and ON, respectively.

Figure 5:
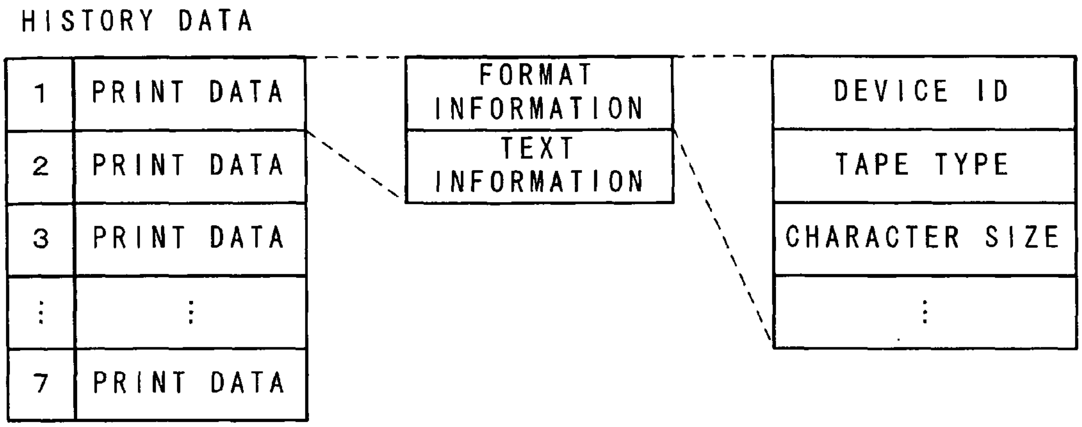
FIG. 5 is an explanatory diagram of a structure of history data stored in a flash memory.

The electrical configuration of the tape printer 1 will be described with reference to FIGS. 4 and 5.

As shown in FIG. 4, the control system of the tape printer 1 is built up around a control circuit unit 100 formed on a control board. The control circuit unit 100 includes a CPU 101, a ROM 102, a CGROM 103, a RAM 104, a flash memory 105, a communications interface 106, and an input/output interface 111, which are interconnected via a bus 110.

The CPU 101 performs main control over the tape printer 1, controlling various data on operations of the tape printer 1. The ROM 102 includes a CG data storage area, a program storage area, and a miscellaneous data area. The CG data storage area stores print dot pattern data associated with corresponding code data for each of characters such as alphabets, Kanji letters, Japanese HIRAGANA letters, Japanese KATAKANA letters, numerals, and symbols. The print dot pattern data is classified by font (Gothic style, Mincho style, etc.) and the print dot pattern data for each font includes data for respective six print character sizes (16, 24, 32, 48, 64, and 96 dots). The CG data storage area also stores graphic pattern data for printing a graphic image. The program storage area stored programs for various processing required to control the tape printer 1. The various processing includes main processing, history print processing, and data reception processing in the tape printer 1. The CPU 101 executes various arithmetic operations based on the various programs stored in the program storage area. The CGROM 103 stores dot pattern data for display associated with corresponding code data for each of a large number of characters.

The RAM 104 temporarily stores various data. The RAM 104 includes a text buffer, a format storage area, and a print buffer. The text buffer stores the code data (text information) of characters, which constitute a document, inputted via the keyboard 3, as document data. The format storage area stores information on a format of a document inputted via the keyboard 3, such as a character size and a tape type including a tape width. In the exemplary embodiment, the tape type such as a tape width may be detected automatically by the detection switches 6 provided in the tape printer 1. The detected tape type is stored as a part of the format information. If a user specifies a character size via the keyboard 3, the specified character size (for example, 7-point size) is stored as a part of the format information. If a character size is not specified, a character size corresponding to the tape width of the tape cassette 51 mounted in the tape printer 1 is automatically set and stored. The print buffer stores print dot patterns of a plurality of characters, the number of pulses to be applied, etc. as dot pattern data. The number of pulses to be applied represents the quantity of energy required to form each dot. Printing by the thermal head 127 can be carried out according to the dot pattern data stored in the print buffer.

The flash memory 105 is a memory that can be electrically written and erased. Even if the flash memory 105 is powered off, information that has been stored in the flash memory 105 can be maintained. In the exemplary embodiment, the flash memory 105 stores print data of a document that has been printed in the tape printer 1, as history data. The history data stored in the flash memory 105 will be described with reference to FIG. 5. As shown in FIG. 5, history data includes a plurality of pieces of print data. Each time a document is printed in the tape printer 1, the print data of the document is automatically added to the history data. In the exemplary embodiment, up to seven pieces of the print data can be stored as the history data. The print data includes text information and format information of a document. The text information includes code data of characters, which constitute the document. The format information includes a device ID, a tape type, and a character size. The device ID is a code that is used to determine which one of the tape printer 1 and the external computer device 20 has created the print data.

The communications interface 106 shown in FIG. 4 is a interface based on, for example, the USB standards. The tape printer 1 can be connected via a USB cable to the external computer device 20 such as a known PC. In the exemplary embodiment, the tape printer 1 can receive print data of a document created by the external computer device 20 via the communications interface 106 and carry out printing based on the received print data.

Connected to the input/output interface 111 are the keyboard 3, the detection switches 6, a display controller (LCDC) 109, and drive circuits 107 and 108. The LCDC 109 has a video RAM (not shown) that is used to output display data to the LCD 4. The drive circuits 107 and 108 drive the thermal head 127 and the tape feeding motor 128, respectively.

The various processing that is performed in the tape printer 1 will be described with reference to FIGS. 6-11. The CPU 101 may perform the pieces of processing shown in FIGS. 6-8 according to the respective processing programs stored in the program storage area of the ROM 102.

Figure 6:
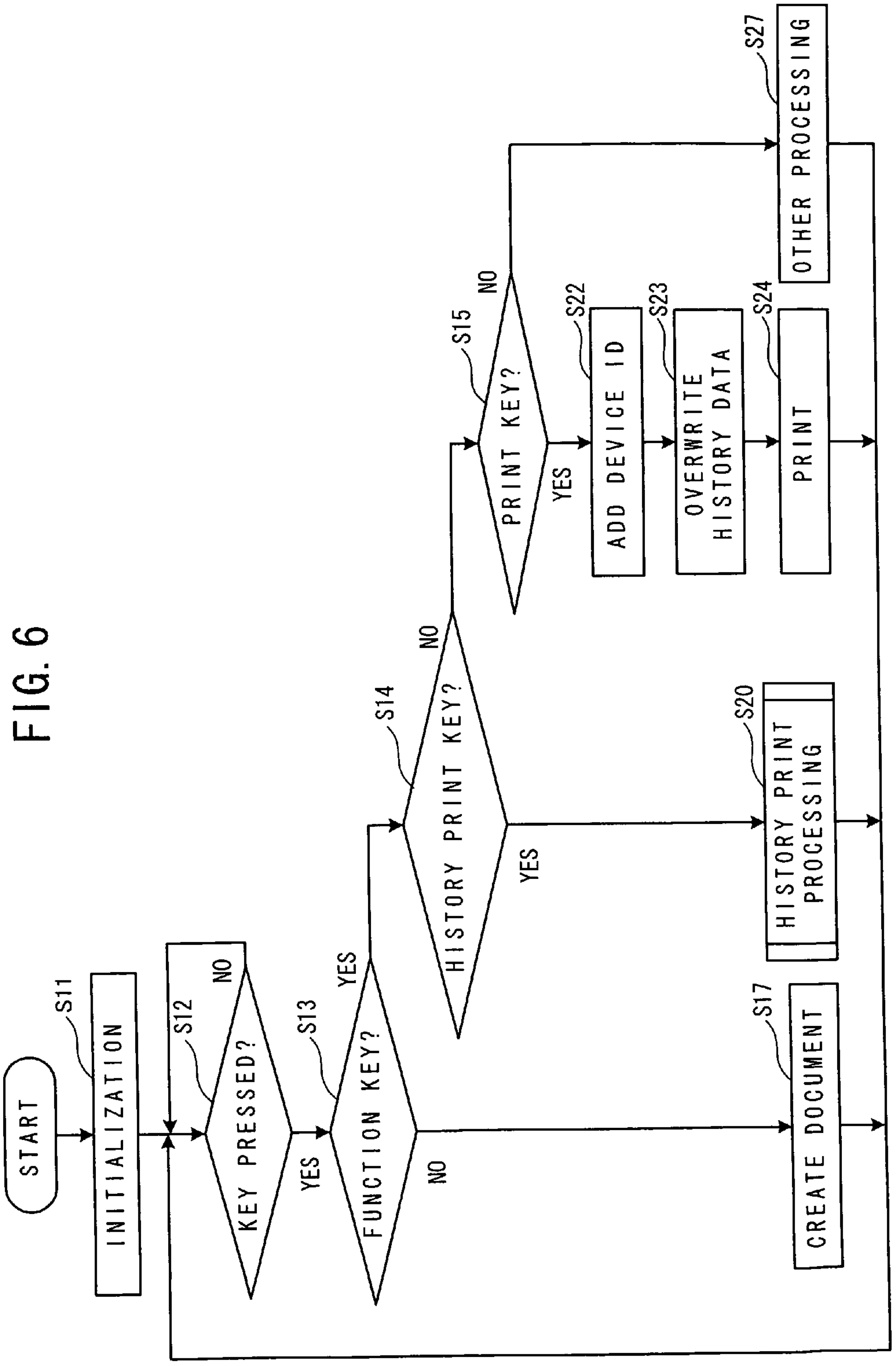
FIG. 6 is a flowchart of main processing of the tape printer.

The main processing in the tape printer 1 will be described with reference to FIG. 6. The main processing shown in FIG. 6 is started when a power supply switch (not shown) of the tape printer 1 is turned on, and is ended when the switch is turned off. When the main processing is started, the CPU 101 performs initialization such as clearing each of storage areas of the RAM 104 (S11). After the initialization, the CPU 101 waits while there is no key input (NO at S12, S12). If a key is pressed (YES at S12), the CPU 101 determines whether the pressed key is a function key (S13). If a key other than the function keys, that is, a character key is pressed (NO at S13), processing to create a document is performed in accordance with an input made by the character key, and the created document is stored in the text buffer of the RAM 104 (S17). Then, the CPU 101 returns to the determination of whether a key is pressed (S12). If the pressed key is a function key (YES at S13), the CPU 101 determines whether the pressed key is a history print key (S14). If the pressed function key is the history print key (YES at S14), the CPU 101 performs history print processing (S20 and FIG. 7) and returns to the determination of whether a key is pressed (S12).

If the pressed function key is not the history print key (NO at S14), the CPU 101 determines whether the pressed function key is a print key (S15). If the pressed key is the print key (YES at S15), the CPU 101 reads out format information (a type of a tape cassette 51, a character size, etc.) of a print object document that is currently stored in the format storage area of the RAM 104 and adds a device ID to the beginning of the format information (S22). If the print key in the tape printer 1 is pressed (YES at S15), which means that it is instructed to print a document that has been created using a character key of the tape printer 1, the CPU 101 adds "PT" as the device ID, which represents document data created in the tape printer 1, to the beginning of the format information (S22).

The CPU 101 reads out text information, which is code data of a document that is currently stored in the text buffer of the RAM 104, and concatenates the text information with the format information to which the device ID has been added, thereby creating print data. More specifically, as shown in FIG. 5, the print data is created which includes the text information and the format information that includes the device ID, the tape type, and the character size. The CPU 101 reads out history data stored in the flash memory 105 into the RAM 104, and adds the created print data to the history data to update the history data. The CPU 101 overwrites the history data in the flash memory 105 with the updated history data (S23). Then, the CPU 101 converts the code data stored in the text buffer into dot pattern data based on the format information stored in the format storage area of the RAM 104, and stores the dot pattern data in the print buffer. The CPU 101 reads out the dot pattern data stored in the print buffer and drives the thermal head 127 and the tape feeding motor 128, thereby performing print processing on the print tape 67 (S24). Then, the CPU 101 returns to the determination of whether a key is pressed (S12).

If the pressed function key is not the print key (NO at S15), the CPU 101 performs other processing corresponding to the pressed key, such as display switch processing (e.g. change in the number of lines in a document to be displayed on the LCD 4).

Figure 8:
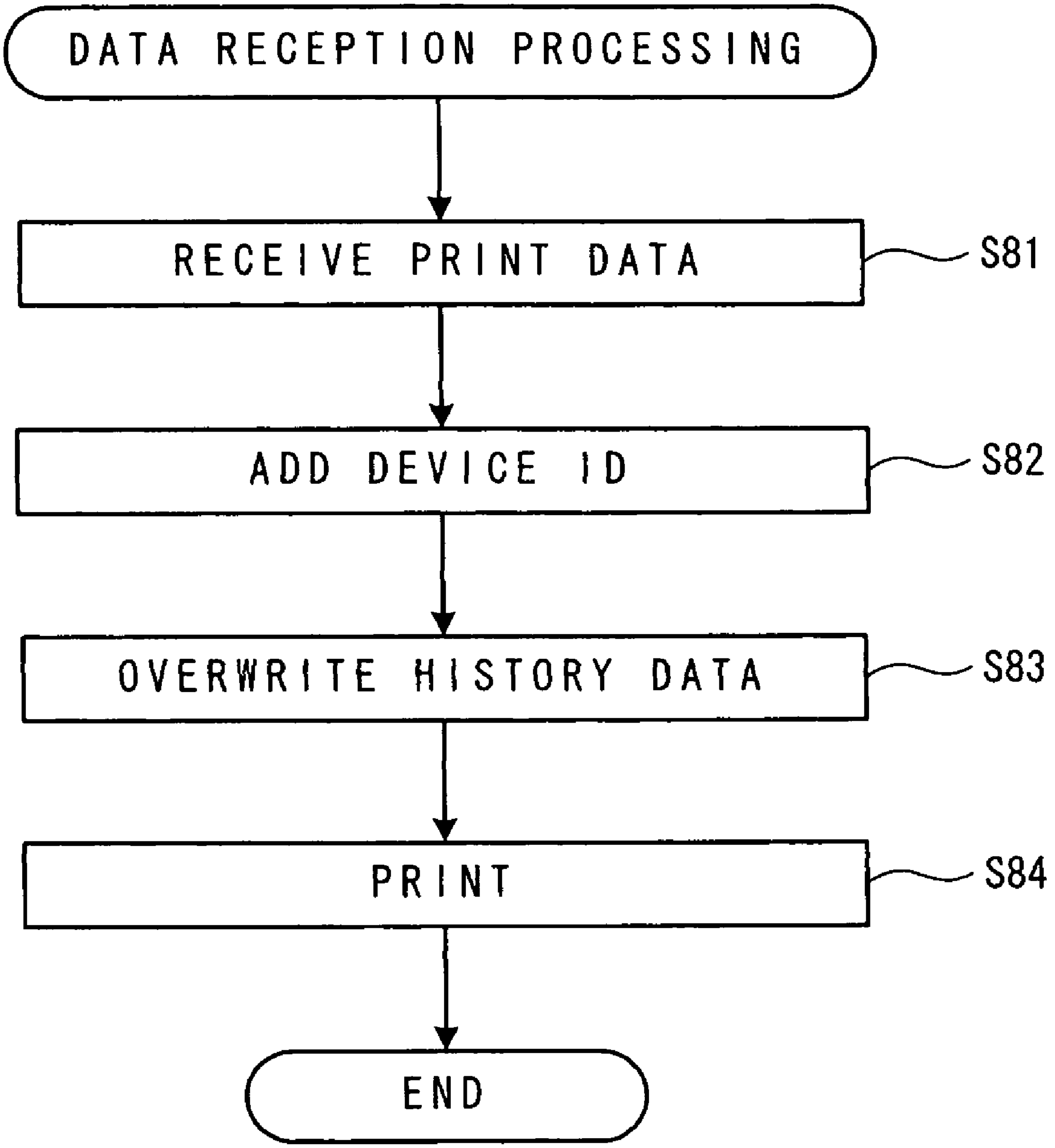
FIG. 8 is a flowchart of data reception processing.

The data reception processing will be described with reference to FIG. 8. The data reception processing is performed as interruption processing in the main processing of FIG. 6, when print data is received from the external computer device 20 via the communications interface 106.

The CPU 101 receives the print data from the external computer device 20 and stores the received print data in the RAM 104 (S81). In the exemplary embodiment, the print data that is received from the external computer device 20 includes format information and text information of a document with the same format as the format of the print data that is created in the tape printer 1. The CPU 101 adds "PC" as a device ID, which represents document data that has been created in the external computer device 20, to the beginning of the format information of the received print data (S82). The CPU 101 adds the print data, to which the device ID has been added, to the history data stored in the flash memory 105 in the same way as in S23 of FIG. 6 (S83). The CPU 101 performs print processing based on the received print data in the same way as in S24 of FIG. 6 (S84) and then terminates the data reception processing.

Figure 7:
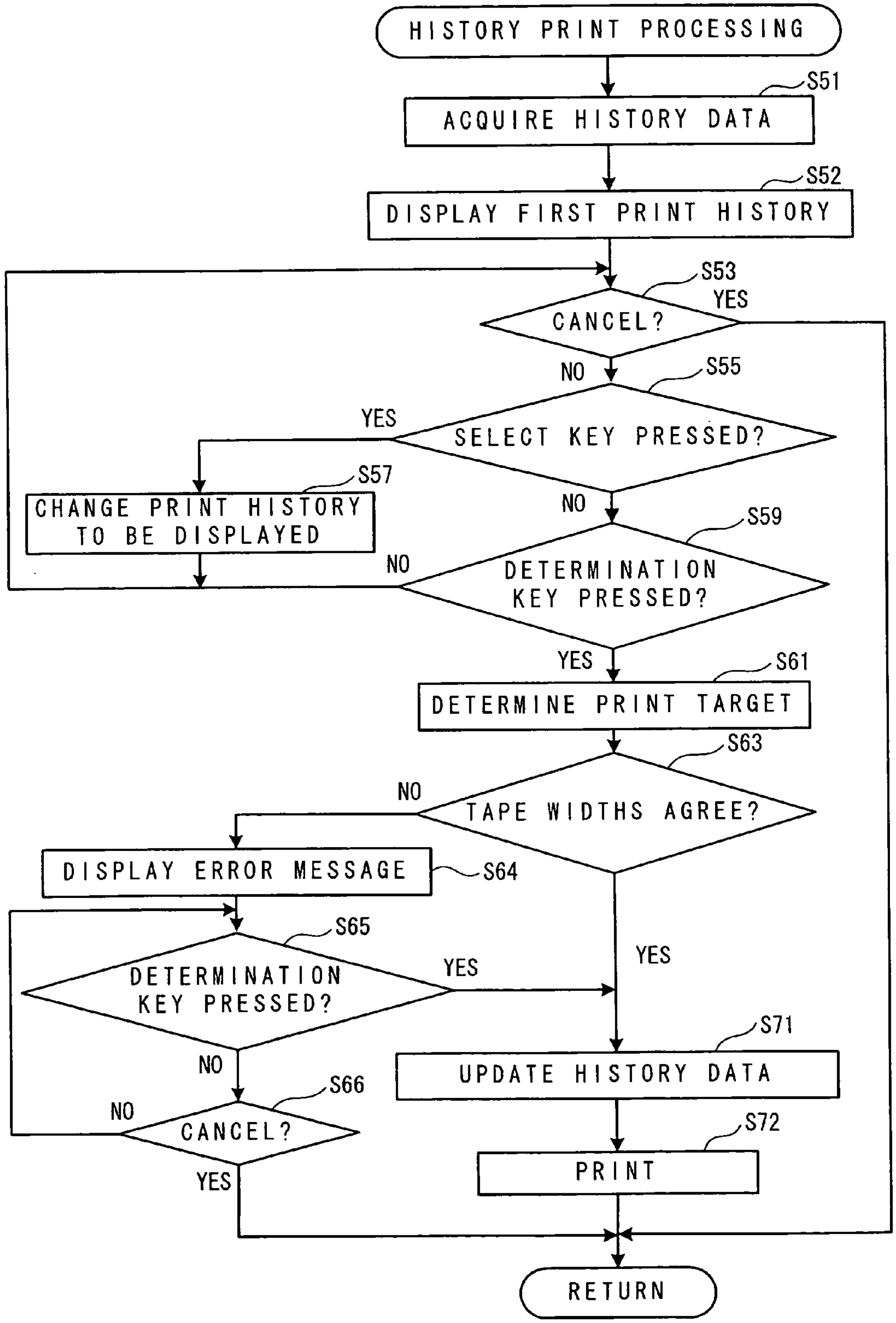
FIG. 7 is a flowchart of history print processing that is performed in the main processing shown in FIG. 6.
Figure 9:
FIG. 9 is an explanatory illustration of a print history that is displayed on a liquid crystal display (LCD)

The history print processing, which is performed in S20 of FIG. 6, will be described with reference to FIGS. 7 and 9-11. In the history print processing, the CPU 101 reads out print data that has been stored as the history data in the flash memory 105 and performs reprinting based on the print data. If the history print processing shown in FIG. 7 is started in response to an input via the history print key (YES at S14 in FIG. 6), the CPU 101 reads out the history data (see FIG. 5) that has been stored in the flash memory 105 and acquires the history data in the RAM 104 (S51). The CPU 101 displays information of the print data that has been used for printing most recently on the LCD 14 as a print history. FIG. 9 shows an example of the displayed print history. As shown in FIG. 9, items that are displayed on the LCD 4 are "Print History", which indicates that the print history is being displayed, a sequence number in the history data (a numeral), a device ID (PT or PC), matching status in the size of print mediums (mark "*" or no mark), and several initial characters of a document. In the example shown in FIG. 9, "1" is displayed as the sequence number in the history data, which indicates that the print history being displayed has been most recently stored. "PT" is displayed as the device ID to indicate that the print data has been created in the tape printer 1. The mark "*" is displayed to show the matching status in the size of the print mediums. In the exemplary embodiment, if a tape width of a tape cassette 51 that is currently mounted in the tape printer 1 (hereinafter referred to as "current tape width") does not match a tape width in the format information of the print data (hereinafter referred to as "print data tape width"), the mark "*" is displayed following the device ID. The current tape width is detected by the detection switches 6. If the current tape width matches the print data tape width, no mark is displayed. The matching status is followed by the several initial characters of the document such as "ABCDEFG" as shown in FIG. 9, based on the text information of the print data. Thus, the user can easily confirm whether the print history currently displayed is a history data of a document that the user desires to reprint.

Figure 10:
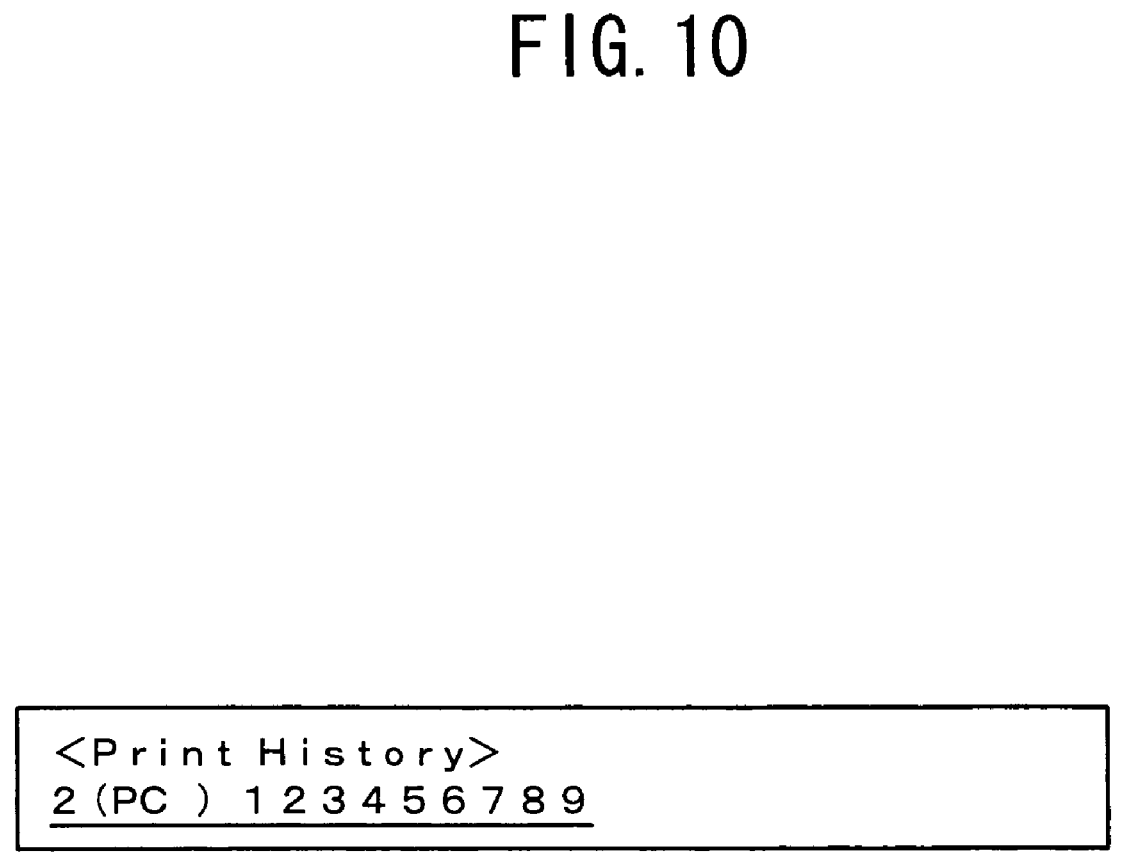

If the cancel key on the keyboard 3 is pressed and cancellation of the history print processing is instructed (YES at S53), the CPU 101 terminates the history print processing shown in FIG. 7 and returns to the main processing shown in FIG. 6. If cancellation of the history print processing is not instructed (NO at S53) and a select key is pressed (YES at S55), the CPU 101 changes a print history to be displayed on the LCD 4, in response to an input from the select key (S57). For example, if a shift to the next print history is instructed via the select key, the CPU 101 displays information of print data that has been used for printing second recently as shown in FIG. 10. In this example, "2(PC)123456789" is displayed. Thus, the user can know that the second recently printed document "123456789" has been created in the external computer device 20 and the print data tape width matches the current tape width. After the CPU 101 changes a print history to be displayed (S57), if the cancellation of the history print processing is not instructed (NO at S53), the CPU 101 determines whether the select key is pressed again (S55). If the select key is pressed again (YES at S55), the CPU 101 displays a print history with a sequence order number that corresponds to an input via the select key in the same way as in the case of the first input via the select key (S57). If the select key is not pressed (NO at S55) and the determination key is pressed (YES at S59), the CPU 101 determines the print data of "1234567898" as a print target. If the determination key is not pressed either (NO at S59), the CPU 101 repeats the processing from S53 to S59 until the cancel key or the determination key is pressed (YES at S53 or YES at S59, respectively).

Figure 11:
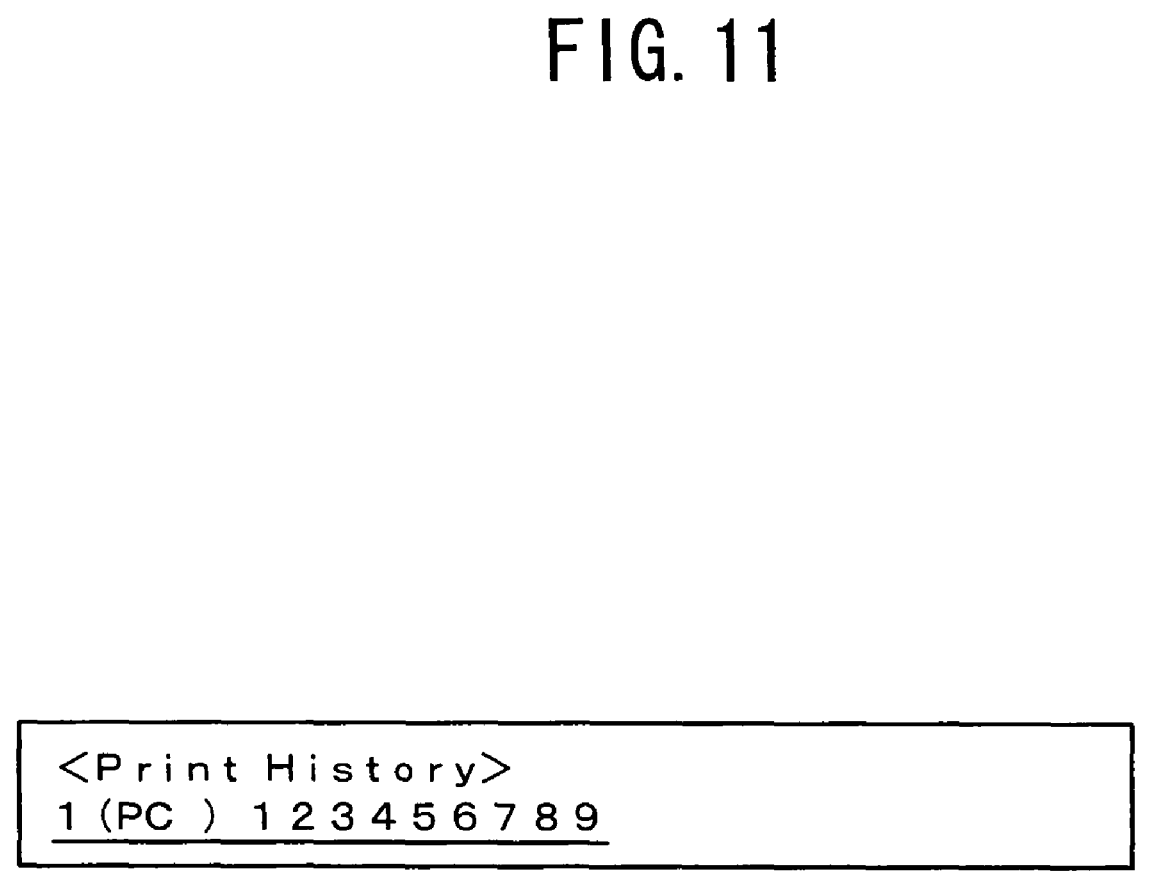

After the print target is determined (S61), the CPU 101 reads out the tape type, which has been detected by the detection switches 6 and stored in the format storage area of the RAM 104. The CPU 101 determines whether the tape width included in information of the read out tape type (current tape width) matches the print data tape width of the print target (S63). If the current tape width and the print data tape width match each other (YES at S63), printing can be performed with no problems. For example, if the print data that has been used for printing second recently is determined as a print target, the CPU 101 adds the second recently used print data to the history data acquired in the RAM 104 to update the history data. The CPU 101 overwrites the history data stored in the flash memory 105 with the updated history data (S71). The CPU 101 performs printing processing to print "123456789" based on the print data determined as the print target in the same way as in S24 of FIG. 6 (S72). Then the CPU 101 returns to the main processing shown in FIG. 6. If the history print processing is instructed again in the main processing (YES at S14 in FIG. 6), a print history to be displayed first on the LCD 4 in S52 of the history print processing shown in FIG. 7 may be "1(PC)123456789" as shown in FIG. 11. After the first print history is displayed (S52), if the determination key is pressed (NO at S53, NO at S55, YES at S59), the history data that is acquired in the RAM 104 is updated (S71) and printing is performed (S72).

If the current tape width does not match the tape width in print data determined as the print target (NO at S63), the CPU 101 displays an error message, such as "Tape Size Error," on the LCD 4 in order to prompt a user to confirm the status (S64). A buzzer sound or an audio announcement may be used as another method. Then, if the determination key is pressed (YES at S65), the CPU 101 updates the history data stored in the flash memory 105 (S71) and printing is performed (S72). Thus, for example, if the current tape width and the tape width in print data of the print target are 24 mm and 18 mm, respectively, the user can recognize that the tape widths do not match each other and, if the user desires, printing can be performed. If neither the determination key nor the cancel key is pressed (NO at S65, NO at S66, S65), the CPU 101 waits until either one of the keys is pressed. If the user presses the cancel key instead of the determination key after confirming the error message (NO at S65, YES at S66), the CPU 101 returns to the main processing shown in FIG. 6.

As described above, in the exemplary embodiment, in printing of a document, print data of the document is automatically stored as history data in the flash memory 105 whether the document is created in the tape printer 1 or is created in the external computer device 20 and then sent to the tape printer 1. By operating the history print key, an user can reprint a desired document by utilizing the history data. Therefore, even in the case where the user disconnects the tape printer 1 from the external computer device 20 after printing so as to carry the tape printer 1 to a place away from the external computer device 20, the user can easily reprint the document created in the external computer device 20. As a result, convenience for the user is enhanced because the user often finds it necessary to reprint a document soon after printing the document. The user can easily identify a desired document because a part of the document can be displayed on the LCD 4 based on text information of the print data stored as history data. Because a device ID is also displayed, the user can recognize whether the document has been created in the tape printer 1 or has been received from the external computer device 20, so that the user can select a desired document more easily. If a tape width of a tape cassette 51 that was used in previous printing do not match a current tape width, an error message is displayed. Thus, the user can recognize that the tape widths do not match each other and determine whether to perform or to stop printing.

The configuration of the above-described exemplary embodiment is only an example and may be modified in various ways as in the following examples. In the exemplary embodiment, up to seven pieces of print data can be stored as history data in the flash memory 105. Therefore, the user can select which one of the pieces of print data of documents should be used for reprinting as a print target after the respective documents have been printed. However, only one piece of print data of a document that has been printed most recently may be stored as history data. In this case, the CPU 101 may perform printing without displaying a print history on the LCD 4 if the history print key is pressed. Thus, the user need not select a print target and can perform reprinting based on history data more easily.

In the exemplary embodiment, print data, which includes format information and text information, is stored in the flash memory 105 as history data. However, only identification information of document data that has been used for printing may be stored as history data so that CPU 101 may read out one piece of print data, which corresponds to a selected piece of identification information, from among separately stored pieces of print data. The identification information may be, for example, an identification number specific to document data, or a combination of the identification number and several initial characters of a document. If identification information includes the several initial characters of a document, a user can easily select a print target in the case where history data includes identification information of a plurality of documents. On the other hand, the print data may be separately stored in the flash memory 105 in response to instructions via a save key etc. from the user. The print data may be separately stored automatically in the flash memory 105 when the identification information is stored in printing. In this case, the print data of the document may be prevented from being stored redundantly in the case where the same document is printed more than once.

In the exemplary embodiment, print data is stored in a condition where a device ID, which is identification information on a device in which a document has been created, has been added to format information included in the print data. The device ID is displayed as a part of a print history on the LCD 4. Although the device ID is useful information for the user to select a desired document, it is also possible that the device ID is not stored as history data or is not displayed on the LCD 4.

In the exemplary embodiment, print data, which is stored as history data, includes format information and text information. Information included in the print data is not limited to the format information and the text information. The print data need not include the format information. The history data may include intermediate data prior to creation of print data in place of the print data. The history data may include input histories of characters, instructions, etc., which the user has inputted in order to create and edit print data, in place of the print data. Further, the history data may include print image data, which has been developed into dot pattern data, in place of print data that includes text information.

In the exemplary embodiment, print data that is stored as history data includes text information whether the print data is received from the external computer device 20 or is created and edited in the tape printer 1. However, the print data that is received from the external computer device 20 may have different data formats from the print data that is created and edited in the tape printer 1.

In the exemplary embodiment, regarding only a tape width of items that are included in information on the tape type, it is determined whether a tape width that was used in previous printing matches a tape width in reprinting, and then an error message is displayed if the tape widths do not match each other. However, the present disclosure is not limited to this example. If the tape widths do not match each other, printing may be cancelled automatically. In this case, it is possible to avoid a disadvantage of wasting a tape due to an unexpected printing result for a user because a character size is adjusted to match the tape width. Besides the tape width, the similar determination may be made on other attributes stored as items of information on a tape type such as sheet materials including standard paper, laminated paper, and a plastic film. Such determination is of use in the case where the user desires to create the same label as the label created in previous printing. On the other hand, it is also possible to omit the determination of whether a tape type in previous printing agrees with a tape type in reprinting.

Although in the exemplary embodiment the tape printer 1 has been described as one example of a printer, the printer need not be dedicated to a tape. It is only necessary that a document as a print target can be created in the printer and a document that is created in an external computer 20 can also be printed in the printer.

Although the exemplary embodiment employs the flash memory 105 to store history data, another storage device such as a battery backed-up RAM may be used.

What is claimed is:

1. A printer comprising:

a connection device that connects to an external device;

a printing device that prints a character on a print medium;

an input device operated by a user to manually input the character and an instruction;

a first data acquisition device that acquires first data created in the external device via the connection device;

a print history storage device that stores print history information of the first data and a second data used for printing by the printing device among the first data acquired by the first data acquisition device and the second data created based on the character and the instruction inputted by the input device;

a print control device that causes the printing device to perform printing based on the print history information stored in the print history storage device; and a display device that displays the print history information stored in the print history storage device, wherein:

the print history information includes identification information and text information, the identification information indicating which one of the external device and the printer has created the first data or the second data, and the text information indicating a character that has been printed; and the display device displays as the print history information at least the identification information and the text information.

2. The printer according to claim 1, further comprising a print target selection device that selects a piece of the print history information stored in the print history storage device as a print target, wherein the print control device causes the printing device to perform printing based on the piece of the print history information selected as the print target by the print target selection device.

3. The printer according to claim 1, wherein the print control device causes the printing device to perform printing based on the print history information of the first data or the second data used for printing most recently.

4. The printer according to claim 1, further comprising:

a first type acquisition device that acquires a first type, the first type being a type of a currently mounted print medium; and a notification device that gives notification of a mismatch in a print medium type, if a second type does not match the first type acquired by the first type acquisition device, the second type being a type of a print medium used in printing by the printing device and included in the print history information.

5. The printer according to claim 1, further comprising a first type acquisition device that acquires a first type, the first type being a type of a currently mounted print medium, wherein the print control device causes the printing device to perform printing if a second type matches the first type acquired by the first type acquisition device, the second type being a type of a print medium used in printing by the printing device and included in the print history information.

6. The printer according to claim 1, wherein the printer is a tape printer that prints the character on a tape as the print medium by using the printing device.

7. A non-transient computer-readable recording medium storing a printing program, the program comprising instructions that cause a controller of a printer to perform:

a first data acquisition step of acquiring first data created in an external device connected to the printer;

a print history storage step of storing print history information of the first data and a second data used for printing among the first data acquired in the first data acquisition step and the second data created based on a character and an instruction manually inputted in the printer by a user using an input device of the printer;

a print control step of performing printing the character on a print medium based on the print history information stored in the print history storage step; and wherein, the print history information includes:

identification information and text information, the identification information indicating which one of the external device and the printer has created the first data or the second data, and the text information indicating a character that has been printed, and the program further comprises:

instructions that cause the controller to perform a display step of displaying as the print history information at least the identification information and the text information.

8. The non-transient computer-readable recording medium according to claim 7, wherein the program further comprises instructions that cause the controller to perform a print target selection step of selecting a piece of the print history information stored in the print history storage step as a print target, wherein the print control step performs printing based on the piece of the print history information selected as the print target in the print target selection step.

9. The non-transient computer-readable recording medium according to claim 7, wherein the print control step performs printing based on the print history information of the first data or the second data used for printing most recently.

10. The non-transient computer-readable recording medium according to claim 7, wherein the program further comprises instructions that cause the controller to perform:

a first type acquisition step of acquiring a first type, the first type being a type of a currently mounted print medium; and a notification step of giving notification of a mismatch in a print medium type, if a second type does not match the first type acquired in the first type acquisition step, the second type being a type of a print medium used in printing and included in the print history information.

11. The non-transient computer-readable recording medium according to claim 7, wherein the program further comprises instructions that cause the controller to perform a first type acquisition step of acquiring a first type, the first type being a type of a currently mounted print medium, wherein the print control step performs printing if a second type matches the first type acquired in the first type acquisition step, the second type being a type of a print medium used in printing and included in the print history data.

12. The non-transient computer-readable recording medium according to claim 7, wherein the printer is a tape printer that prints the character on a tape as the print medium.

* * * * *